(12) United States Patent
Chu

(10) Patent No.: US 6,334,713 B1
(45) Date of Patent: Jan. 1, 2002

(54) BEARING ASSEMBLY HAVING AN IMPROVED WEAR RING LINER

(75) Inventor: Tim Chu, Elizabethtown, KY (US)

(73) Assignee: Roller Bearing Industries, Inc., Richmond, VA (US)

( * ) Notice: Subject to any disclaimer, the term of this patent is extended or adjusted under 35 U.S.C. 154(b) by 0 days.

(21) Appl. No.: 09/312,502

(22) Filed: May 17, 1999

Related U.S. Application Data
(60) Provisional application No. 60/086,340, filed on Mar. 23, 1999.

(51) Int. Cl.$^7$ ................................................ F16C 33/78
(52) U.S. Cl. ........................................................ 384/464
(58) Field of Search ................................ 384/291, 292, 384/276, 147, 148, 484

(56) References Cited

U.S. PATENT DOCUMENTS

| | | |
|---|---|---|
| 2,208,482 A | 7/1940 | Victor |
| 2,834,616 A | 5/1958 | Gebert et al. |
| 2,875,004 A | 2/1959 | McNicoll |
| 2,879,114 A | 3/1959 | Bowen |

(List continued on next page.)

FOREIGN PATENT DOCUMENTS

JP           46-17442       5/1971

OTHER PUBLICATIONS

Figure 2, Class F (6–1/2×12) K151590 Seal Wear Ring; Timken Company; 1993; Order No. 8120.

Tech Note; AAR Has Approved a Second Timken Solution to Fretting Wear Grooves at the Inboard Seal Wear Ring; 1998; Order No. 8186.

*Primary Examiner*—Lenard A. Footland
(74) *Attorney, Agent, or Firm*—Banner & Witcoff, Ltd.

(57) ABSTRACT

Aspects of the present invention overcome one or more of the above mentioned problems by using improved bearing assemblies and/or improved wear ring liners. For example, an aspect of the present invention includes configuring a bearing assembly to include a wear ring having an integral wear ring liner which allows oil or other lubricants to pass along or through the wear ring. In aspects of the invention, the wear ring liner is of a low abrasion, low friction material such as a polymeric (e.g., nylon), synthetic rubber, elastomeric, graphite, and/or other low friction lining material. The low abrasion/friction liner material provides a cushioning between the wear ring and the shaft. Thus, fretting of the shaft is substantially reduced or eliminated while at the same time allowing the wear ring to derive its concentricity directly from the shaft.

12 Claims, 10 Drawing Sheets

U.S. PATENT DOCUMENTS

| | | |
|---|---|---|
| 2,977,138 A | 3/1961 | Brittain, Jr. |
| 3,011,814 A | 12/1961 | Rhoads et al. |
| 3,021,161 A | 2/1962 | Rhoads et al. |
| 3,135,518 A | 6/1964 | Carson et al. |
| 3,207,521 A | 9/1965 | Dega |
| 3,268,278 A | 8/1966 | Purdy |
| 3,356,376 A | 12/1967 | Bradfute et al. |
| 3,457,732 A | 7/1969 | Decouzon |
| 3,467,395 A | 9/1969 | Kan |
| 3,472,519 A | 10/1969 | Gehret |
| 3,494,682 A | 2/1970 | Keller |
| 3,512,853 A | 5/1970 | Petros |
| 3,531,168 A | 9/1970 | JBainard |
| 3,580,093 A | 5/1971 | Tomizawa |
| 3,612,547 A | 10/1971 | Kan |
| 3,614,183 A | 10/1971 | Berens et al. |
| 3,636,016 A | 1/1972 | McGuire |
| 3,697,414 A | 10/1972 | Carpenter et al. |
| 3,717,394 A | 2/1973 | Pitner |
| 3,741,615 A | 6/1973 | Otto |
| 3,937,539 A | 2/1976 | Jones et al. |
| 3,954,517 A | 5/1976 | Jatczak et al. |
| 3,969,029 A | 7/1976 | Schaeffler |
| 4,004,952 A | 1/1977 | Jatczak et al. |
| 4,032,369 A | 6/1977 | Jatczak et al. |
| 4,043,620 A | 8/1977 | Otto |
| 4,054,999 A | 10/1977 | Harbottle |
| 4,085,984 A | 4/1978 | Cameron |
| 4,136,748 A | 1/1979 | Dickerhoff |
| 4,136,916 A | 1/1979 | Musselmann et al. |
| 4,150,468 A | 4/1979 | Harbottle |
| 4,203,635 A | 5/1980 | Reiter |
| 4,208,057 A | 6/1980 | Messenger |
| 4,235,485 A | 11/1980 | Reiter |
| 4,317,601 A | 3/1982 | Faigley, Jr. |
| 4,325,591 A | 4/1982 | Otto |
| 4,336,641 A | 6/1982 | Bhaita |
| 4,336,971 A | 6/1982 | Reiter |
| 4,341,426 A | 7/1982 | Clapp |
| 4,399,998 A | 8/1983 | Otto |
| 4,400,040 A | 8/1983 | Toth et al. |
| 4,425,011 A | 1/1984 | Cunningham et al. |
| 4,427,241 A | 1/1984 | Jatczak |
| 4,428,586 A | 1/1984 | Ramero |
| 4,428,630 A | 1/1984 | Folger et al. |
| 4,448,426 A | 5/1984 | Jackowski et al. |
| 4,448,461 A | 5/1984 | Otto |
| 4,462,643 A | 7/1984 | Gilbert et al. |
| 4,512,525 A | 4/1985 | Cameron |
| 4,541,738 A | 9/1985 | Leibensperger et al. |
| 4,552,367 A | 11/1985 | Fedorovich et al. |
| 4,571,097 A | 2/1986 | Lee et al. |
| 4,601,592 A | 7/1986 | Jatczak et al. |
| 4,692,040 A | 9/1987 | Ebaugh et al. |
| 4,696,479 A | 9/1987 | Karcher |
| 4,721,312 A | 1/1988 | Hornberger |
| 4,721,598 A | 1/1988 | Lee |
| 4,761,018 A | 8/1988 | Abbruzzi et al. |
| 4,770,424 A | 9/1988 | Otto |
| 4,770,548 A | 9/1988 | Otto |
| 4,799,808 A | 1/1989 | Otto |
| 4,800,652 A | 1/1989 | Ballas et al. |
| 4,808,012 A | 2/1989 | Otto |
| 4,819,949 A | 4/1989 | Otto |
| 4,842,100 A | 6/1989 | Cameron et al. |
| RE33,029 E | 8/1989 | Bainard et al. |
| 4,865,794 A | 9/1989 | Nakajima et al. |
| 4,877,340 A | 10/1989 | Hoeprich |
| 4,900,166 A | 2/1990 | Candiard |
| 4,921,260 A | 5/1990 | Takenaka et al. |
| 4,936,591 A | 6/1990 | Ramero |
| 4,938,615 A | 7/1990 | Baker |
| 4,960,335 A | 10/1990 | Otto et al. |
| 4,981,303 A | 1/1991 | Matsushima et al. |
| 5,009,523 A | 4/1991 | Folger et al. |
| 5,017,025 A | 5/1991 | Williams |
| 5,021,035 A | 6/1991 | Zhou |
| 5,022,659 A | 6/1991 | Otto |
| 5,024,449 A | 6/1991 | Otto |
| 5,028,152 A | 7/1991 | Hill et al. |
| 5,037,214 A | 8/1991 | Dougherty |
| 5,058,262 A | 10/1991 | Brockmüller et al. |
| 5,082,294 A | 1/1992 | Toth et al. |
| 5,085,519 A | 2/1992 | Dougherty |
| 5,100,315 A | 3/1992 | Schodorf et al. |
| 5,121,998 A | 6/1992 | Bhatia |
| 5,125,156 A | 6/1992 | Witte |
| 5,129,744 A | 7/1992 | Otto et al. |
| 5,159,742 A | 11/1992 | Winter |
| 5,183,269 A | 2/1993 | Black et al. |
| 5,201,528 A | 4/1993 | Upper |
| 5,203,391 A | 4/1993 | Fox |
| 5,211,406 A | 5/1993 | Katzensteiner |
| 5,309,639 A | 5/1994 | Lee |
| 5,325,599 A | 7/1994 | Russell |
| 5,350,181 A | 9/1994 | Horve |
| 5,380,102 A | 1/1995 | Sink |
| 5,386,630 A | 2/1995 | Fox |
| 5,399,026 A | 3/1995 | Witte |
| 5,409,554 A | 4/1995 | Leap |
| 5,411,335 A | 5/1995 | Driver |
| 5,440,184 A | 8/1995 | Samy et al. |
| 5,454,647 A | 10/1995 | Otto |
| 5,458,420 A | 10/1995 | Otto |
| 5,462,171 A | 10/1995 | Moog et al. |
| 5,462,367 A | 10/1995 | Davidson et al. |
| 5,470,157 A | 11/1995 | Dougherty et al. |
| 5,478,523 A | 12/1995 | Brusso et al. |
| 5,488,871 A | 2/1996 | Horbottle et al. |
| 5,494,358 A | 2/1996 | Dougherty |
| 5,503,481 A | 4/1996 | Hashimoto et al. |
| 5,553,870 A | 9/1996 | Czekansky et al. |
| 5,582,412 A | 12/1996 | Filho |
| 5,588,752 A | 12/1996 | Fetty |
| 5,595,272 A | 1/1997 | Zhou |
| 5,609,456 A | 3/1997 | Joki |
| 5,648,611 A | 7/1997 | Singh et al. |
| 5,662,445 A | 9/1997 | Harbottle et al. |
| 5,685,648 A * | 11/1997 | Harris et al. ................. 384/291 |
| 5,688,201 A | 11/1997 | Zhou |
| 5,722,644 A | 3/1998 | Otto |
| 5,735,612 A | 4/1998 | Fox et al. |
| 5,755,323 A | 5/1998 | Zahn et al. |
| 5,865,542 A * | 2/1999 | Ryu ........................... 384/291 |

\* cited by examiner

BEARING ASSEMBLY HAVING AN IMPROVED WEAR RING LINER

This application claims the benefit of application Ser. No. 60/086,340 filed Mar. 23, 1999.

TECHNICAL FILED

The present invention relates generally to bearing assemblies, and, in particular, to devices and methods for configuring bearing assemblies with an improved wear ring liner.

BACKGROUND OF THE INVENTION

Bearing assemblies allow a wheel to rotate about a shaft (also called an axle or journal). Bearing assemblies are often sealed to maintain a lubricant within the bearing assembly and to prevent dirt, sand, and moisture from entering the bearing assembly. The seal is typically formed of an annular rubber lip seal which rotates about the shaft. In some conventional arrangements, the annular rubber lip seal rotates about and contacts the shaft. See, for example, U.S. Pat. Nos. 2,208,482, 3,614,183, 3,717,394, 3,457,732, and 3,531,168. However, it was found that the annular rubber lip seal has a tendency to wear a groove into the shaft which may weaken the shaft and/or reduce the sealing efficiency of the seal. Since shafts are expensive to replace, this sealing arrangement was not optimal.

Other conventional arrangements fitted a metal sleeve (called a wear ring) tightly over the shaft to prevent damage to the shaft. The wear ring may be part of the bearing race or separate from the bearing race. See, for example, U.S. Pat. Nos. 5,380,102, 4,336,971, 4,235,485, 3,636,016, 3,021,161, 2,977,138, 2,875,004. In these embodiments, the annular rubber lip seal contacted the wear ring and thus prevented wearing away of the shaft by the seal. However the use of a wear ring created its own problem in that heavy loads and stresses on the wheel causes the shaft to flex and the annular rubber lip seal to pound against the wear ring. This action, in turn, caused the wear ring to impact on the shaft. This constant impact resulted in fretting (wearing away) of the shaft in the area where the wear ring is fitted over the shaft. As the fretting continues, eventually, the wear ring is no longer concentric with the shaft which eventually leads to seal failure.

Another conventional arrangement spaces the wear ring from the shaft at one end using a backing ring with a counter bore to center the wear ring about the shaft. The other end continues to be interference fit with the shaft. In this manner, the portion of the wear ring which is contacted by the annular rubber lip seal does not contact the shaft. There are a multitude of examples of this arrangement such as U.S. Pat. Nos. 2,879,114, 2,834,616, 3,612,547, 3,494,682, 3,741,615, and 5,024,449. Heat transfer bet ween the wear ring and the shaft is accomplished by contact with the backing ring, contact with the shaft, and vent holes which allow an oil or other lubricant to fill the void between the wear ring and the shaft. Although this wear ring arrangement has reduced fretting and continues to be used today, still some fretting remains where the wear ring contacts the shaft.

Other conventional arrangements configure the wear ring to include a wear ring liner, typically formed integral with an outer wear ring element, to prevent damage to the shaft. There are a multitude of examples of wear rings which include wear ring liners such as U.S. Pat. Nos. 5,211,406, 5,129,744, 4,936,591, 4,448,426, 4,552,367, 4,981,303, 4,696,479, 4,208,057, RE U.S. Pat. Nos. 33,029, 4,865,794, 4,721,312, 3,697,414, 3,580,093, 4,552,367, 4,856,794, 5,183,269, 5,201,528, 5,549,395, 5,350,181, 4,921,260, 3,011,814, 3,135,518, 4,428,586, 3,356,376, 5,582,412. Although wear rings which include wear ring liners prevent damage to the shaft, the liners are disadvantageous in that they also act as insulators or to block oil flow. Thus, the wear ring liners localize heat build-up at the critical location where the annular rubber lip seal rotates about the wear ring. This can lead to accelerated drying of lubricant from the annular rubber lip seal and eventually to premature failure of the seal. Accordingly, improved wear ring liners which prevent damage to the shaft and avoid localized heat are desirable.

U.S. Pat. No. 5,082,294, attempts to solve this problem by impregnating a polymeric wear ring liner with metallic particles. However, this solution is disadvantageous in that the heat transfer coefficient of the metal impregnated wear ring liners is not optimal. Further, the metal impregnated wear ring liners in accordance with this patent have increased cost, reduced resiliency, and increased abrasion properties. Accordingly, there exists a need for an improved low cost wear ring liner which has high heat transfer properties without the reduced resiliency, increased cost, and increased abrasion properties of the prior heat conductive wear ring liners.

Another conventional arrangement is where the wear ring is completely spaced from the shaft. See, for example, U.S. Pat. Nos. 4,692,040, and 5,017,025, as well as Japanese Patent Laid Open 46-17442. However, these arrangements are disadvantageous in that one or both ends of the wear ring is cantilevered without any support. The end which is left unsupported tends to wear the face of the bearing race to which it abuts. Thus, while spacing the wear ring from the shaft along its entire distance may prevent fretting about the shaft, it increases fretting of the face of the bearing race. Further, the wear ring may loose concentricity due to constant impacts which leads to premature seal failure. Additionally, this arrangement is disadvantageous because it is not always possible to precisely align the wear rings in the manner disclosed. This misalignment results in seal wear over time and eventual seal failure. Accordingly, there exists a need for an improved low cost wear ring which does not have a tendency to loose concentricity or wear the face of the bearing race.

SUMMARY OF THE INVENTION

Aspects of the present invention overcome one or more of the above mentioned problems by using improved bearing assemblies and/or improved wear ring liners. For example, an aspect of the present invention includes configuring a bearing assembly to include a wear ring having an integral wear ring liner which allows oil or other lubricants to pass along or through the wear ring. In aspects of the invention, the wear ring liner is of a low abrasion, low friction material such as a polymeric (e.g., nylon), synthetic rubber, elastomeric, graphite, and/or other low friction lining material. The low abrasion/friction liner material provides a cushioning between the wear ring and the shaft. Thus, fretting of the shaft is substantially reduced or eliminated while at the same time allowing the wear ring to derive its concentricity directly from the shaft.

In aspects of the invention, the wear ring liner is interference fit with the journal to maintain the wear ring liner concentric with the journal.

Methods and apparatus in accordance with the present invention increase longevity and integrity of wear ring seals and shaft. Further, maintenance time and associated repair costs are reduced.

In further aspects of the present invention, the wear rings include wear ring liners which are porous. The porous wear ring liners allow oil to flow through and contact the wear ring directly beneath the location of the wear ring which contacts the annular rubber lip seal. The lubricant acts as a heat conducting medium to transfer heat from the wear ring to the shaft, thus preventing premature failure of the wear ring seal. Thus, the present invention is a substantial improvement over any conventional wear ring liners.

In yet further aspects of the invention, deformations in the wear ring liner reduce friction as the wear ring is pressed onto the shaft. Since the deformations result in less surface area in contact with the shaft, friction is reduced.

In still further aspects of the invention, a chemical or ultrasonic bonding technique is utilized to make the wear ring liner integral with the wear ring. The use of an integral bonding technique allows the wear ring liner to be integrally bounded to the wear ring without any appreciable decrease in the overall thickness of the wear ring. Thus, the structural integrity of the wear ring is maintained.

In yet further aspects of the invention, the bearing assembly is configured such that the wear ring liner is restrained by the backing ring and/or the inner race to prevent the wear ring liner from becoming deformed.

These and other features of the invention will be apparent upon consideration of the following detailed description of preferred embodiments. Although the invention has been defined using the appended claims, these claims are exemplary in that the invention is intended to include the elements and steps described herein in any combination or subcombination. Accordingly, there are any number of alternative combinations for defining the invention, which incorporate one or more elements from the specification, including the description, claims, and drawings, in various combinations or subcombinations. It will be apparent to those skilled in roller bearing assembly theory and design, in light of the present specification, that alternate combinations of aspects of the invention, either alone or in combination with one or more elements or steps defined herein, may be utilized as modifications or alterations of the invention or as part of the invention, It is intended that the written description of the invention contained herein covers all such modifications and alterations.

BRIEF DESCRIPTION OF THE DRAWINGS

The present invention will now be described in more detail with reference to preferred embodiments of the invention, given only by way of example and not limitation, and illustrated in the accompanying drawings in which.

DETAILED DESCRIPTION

Figure 1:
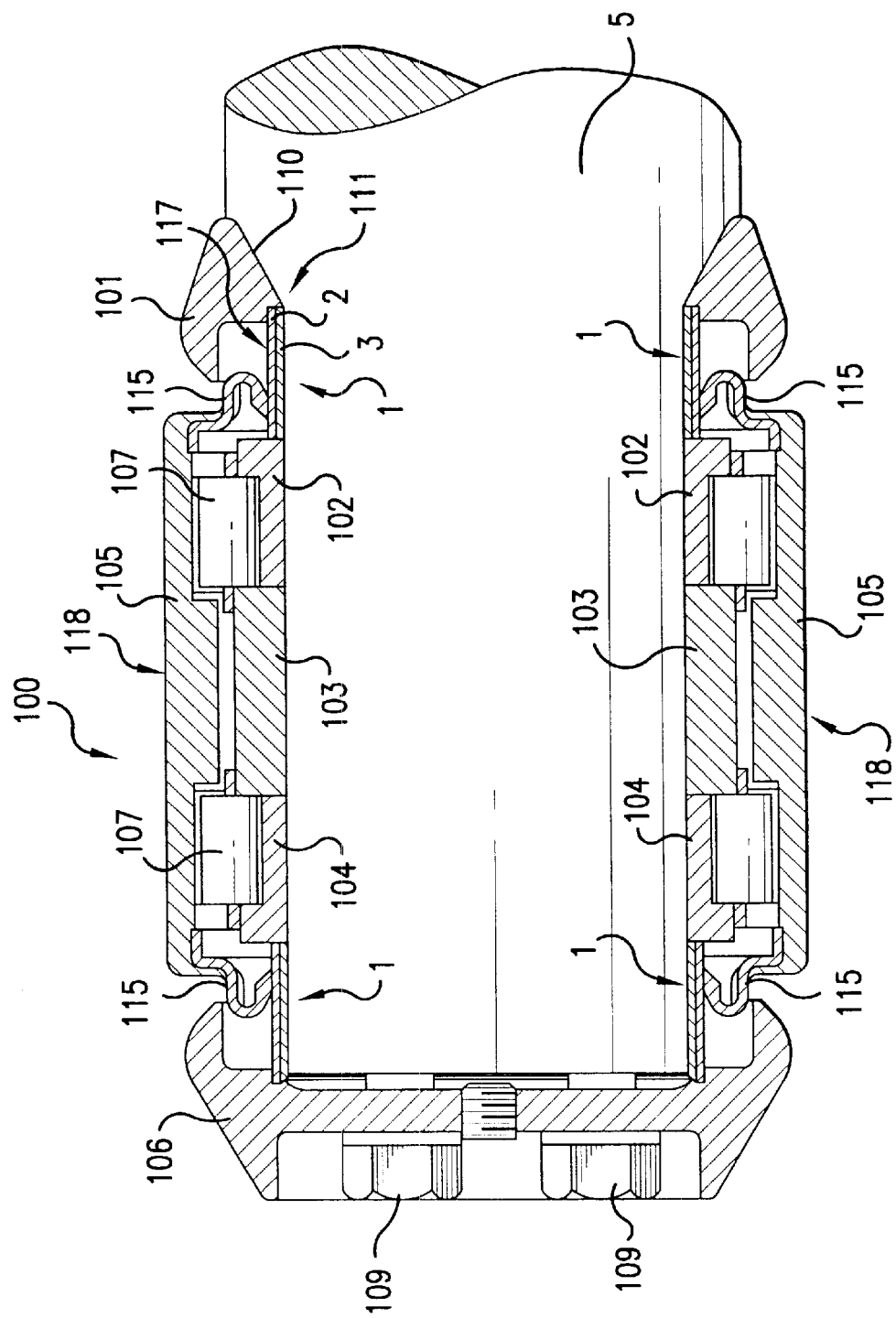
FIG. 1 illustrates a first exemplary embodiment of a bearing assembly having a wear ring configured in accordance with aspects of the present invention.

Referring to FIG. 1, a first exemplary embodiment of a bearing assembly 100 according to aspects of the present invention is shown. The bearing assembly 100 may include a backing ring 101 mounted on a fillet (tapered portion) 110 of shaft 5. The backing ring 101 may include a counter bore 111 configured to receive a wear ring 1. The wear ring 1 may comprise an outer wear ring element 2 and in inner wear ring liner 3. The wear ring 1 may be disposed between an inner bearing race 102 and the backing ring 101. An annular rubber lip seal 115 slides around an outer surface 117 of wear ring 1, forming a seal which prevents dirt and other lubricants from entering the interior of the sealed bearing housing 118. A spacer 103 is compressed between an outer bearing race 104 and the inner bearing race 102. A plurality of bearings 107 are disposed between the inner bearing race 102 and a bearing cap 118 and between the outer bearing race 104 and the bearing cap 118. The bearings are disposed on an outwardly directed race way on the inner and outer bearing races and on an inwardly directed raceways on the bearing cap 118. A second wear ring 1 is compressed between an end cap 106 and the outer bearing race 104 using, for example, one or more bolts 109.

In the embodiment shown in FIG. 1, there are two wear rings 1 configured in accordance with aspects of the present invention. Alternatively, the wear ring 1 in accordance with aspects of the invention may be used only between the inner bearing race 102 and the backing ring 117 with a conventional wear ring disposed between the end cap 106 and the outer bearing race 104. In other embodiments, the wear ring 1 in accordance with aspects of the invention may be used only between the end cap 106 and the outer bearing race 104 with a conventional wear ring disposed between the inner bearing race 102 and the backing ring 117.

Figure 2A:
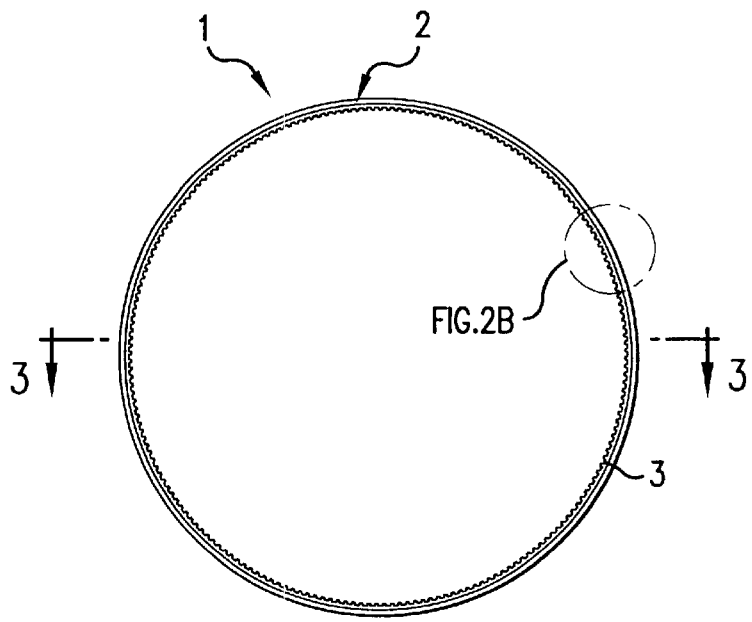
FIG. 2A illustrates a first exemplary embodiment of a wear ring in accordance with aspects of the present invention.
Figure 2B:
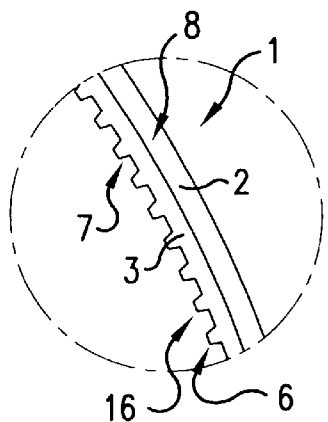
FIG. 2B illustrates a detailed illustration of the wear ring utilized in the embodiment shown in FIG. 2A.

Referring to FIGS. 2A and 2B, the wear ring 1 in accordance with aspects of the present invention may include the inner wear ring liner 3 and outer wear ring element 2. The outer wear ring element 2 may be variously configured to comprise any suitable material such as a metal or metal alloy (e.g., steel). Although the outer wear ring element is typically comprised of steel, other suitable materials may also be utilized which have sufficient compressive and tensile strength such as graphite, graphite composites including metal impregnated graphite, polymers (e.g., nylon), ceramics and/or any compositions such as a ceramic metal, a plastic metal and/or a rubber metal compound. The inner wear ring liner 3 may be variously configured as well. For example, the inner wear ring liner 3 may be formed of a polymeric, graphite, ceramic and/or a composite such as a ceramic metal, a plastic metal and/or a rubber metal compound. In this manner, the thermal conductivity between the inner wear ring liner and the outer wear ring element is increased. In yet other embodiments, the inner wear ring liner 3 is made porous such that a heat conductive lubricant such as oil or a thermal grease is utilized to conduct heat between the outer wear ring element 2, through the inner wear ring liner 3 to the shaft 5. An inner wear ring liner 3 which is porous is particularly useful where the inner wear ring liner is made of a low heat conductive material such as a polymeric or rubber compound.

Figure 3:
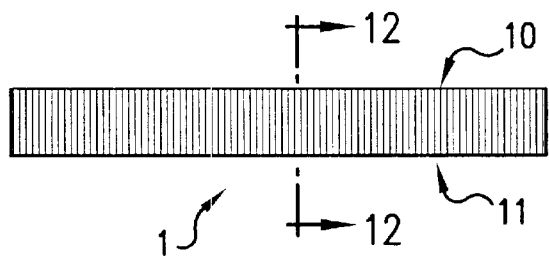
FIG. 3 illustrates a cross section of FIG. 2A along line 3—3.

In the exemplary embodiment shown in FIGS. 2A, 2B, and 3, a plurality of deformations 16 (e.g., ribs, holes, bumps, divots, dimples, woven or non-woven mesh, passages, channels, and/or undulations) may be included in the inner wear ring liner 3. The deformations 16 allow the inner wear ring liner 3 to temporarily flex with impacts on the outer surface of the outer wear ring element 2. After the impact resides, the inner wear ring liner springs back into position forcing the outer wear ring element 2 to derive its concentricity directly from the shaft via the resilient force applied by the wear ring liner between the wear ring 1 and the shaft 5. In many embodiments, it may be desirable to machine the deformations into the inner wear ring liner 3 such that the deformations are maintained within tight tolerances as to height, width, depth, density, spacing, and/or overall size. Alternatively, a forming or molding process may be utilized (with or without a subsequent machining process) such that the deformations 16 are maintained in close tolerance.

The deformations 16 may extend axially and/or circumferentially across the inner and/or outer surface 7,8 of the inner wear ring liner 3. For example, the outer surface 8 of the inner wear ring liner 3 may include a plurality of circumferentially extending deformations 16 whereas the inner surface 7 of the inner wear ring liner 3 may include a plurality of axially extending deformations. Alternatively, the outer surface 8 of the inner wear ring liner 3 may include a plurality of axially extending deformations whereas the inner surface 7 of the inner wear ring liner may include a plurality of circumferentially extending deformations. The inner wear ring liner 3 may include a plurality of holes allowing passageways formed by the deformations 16 in the inner and/or outer surface of the inner wear ring liner to communicate.

Where the inner wear ring liner 3 includes a material which has a low thermal conductivity, it may be desirable to include a plurality of deformations 16 configured to permit oil or other thermally conductive material such as a thermal grease to transfer heat between the outer wear ring element 2 and the inner wear ring liner 3. The use of a lubricant for this purpose has the added advantage that abrasion (fretting) of the shaft is substantially reduced. The oil or other thermally conductive lubricant in the wear ring liner may form a heat sink between the outer wear ring element 2 and the shaft 5. By filling the holes with a thermally conductive grease and/or oil, heat is transferred from the outer wear ring element 2 through the wear ring liner to the shaft 5. In this manner, the wear ring liner 3 does not interfere with the transfer of heat from the wear ring 2 to the shaft 5.

Thus, in many applications it is preferred to include a wear ring liner which is porous. Porosity may be achieved using a plurality of holes configured to allow lubricant to flow axially and/or radially through the inner wear ring liner. The porosity factor (e.g., voids density) of the inner wear ring liner may be about 20%, 30%, 35%, 40% or even 50% or more of open space for the lubricant to flow freely between the outer wear ring element 2 and the shaft 5. The voids density of the wear ring liner is a trade off between a resiliency factor for maintaining the concentricity of the outer wear ring element 2 about the shaft 5 while allowing for heat conduction between the shaft 5 and the outer wear ring element 2.

As yet a further embodiment, the deformations may also be included in the outer wear ring element 2 to accommodate the flow of a cooling lubricant. However, in some applications, this embodiment may be less desirable where the deformations are of a sufficient depth to weaken the outer wear ring element 2. Further, the use of deformations in the outer wear ring element 2 do not contribute to the spring action where the outer wear ring element is formed of a rigid substance such as steel.

The deformations discussed above may be configured to allow a lubricant such as oil or heat conducting grease to spread throughout the inner wear ring liner 3. This lubricant may act to reduce frictional forces when pressing the wear ring 1 onto the shaft 5. Where the deformations are disposed along the inner surface of the inner wear ring liner 3, they may be configured to carry lubricant along the shaft 5 and store this lubricant within the inner wear ring liner to further reduce the amount of fretting or other wear between the wear ring liner and the shaft 5.

The deformations 16 may be configured to have a two or three stage attenuation action against compression of the outer wear ring element 2. For example, where the deformations are stepped such that they include protrusions which are wider at the base and narrower at the top, a two stage attenuation is provided. The smaller diameter protrusion near the top provides a first spring force while the larger diameter protrusion near the bottom provides a second spring force, greater then the first. Small forces on the outer wear ring element or shaft allow some flexibility against the first spring force. As the deflection increases, a second spring force acts to keep the deflections from exceeding a predetermined level. Deformations allow the wear ring liner to temporarily give way an axial and/or a radial direction before returning to form.

Figure 4:
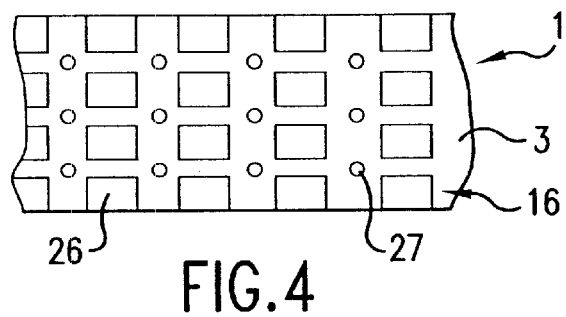
FIG. 4 illustrates a exemplary embodiment of an inner wear ring liner which is perforated.

Referring to FIG. 4, the wear ring 1 may include an inner wear ring liner 3 having a plurality of deformations 16. In the embodiment shown in FIG. 4, the deformations 16 are formed using a plurality of projections 26 which may be square, circular, triangular, pyramid, oblong, ribs, rectangular, diamond, and/or multi-sided. The inner wear ring liner 3 may also include a plurality of holes 27 in addition to or in place of the plurality of projections. The plurality of holes may be any suitable configurations such as circular, square, triangular, pyramid, oblong, rectangular, slots, diamond, and/or multi-sided.

Figure 5:
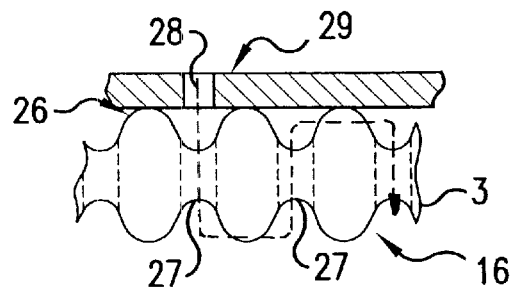
FIG. 5 illustrates another exemplary embodiment of an inner wear ring liner.

Referring to FIG. 5, the deformations 16 may be configured to allow a lubricant 28 to flow along the wear ring 1 either axially and/or radially. In exemplary embodiments, the lubricant may flow only along the upper surface of the inner wear ring liner, only along the lower surface of the inner wear ring liner 3, along both the inner and outer surface of the wear ring liner, and/or through the wear ring liner 3. For example, referring to FIG. 5, the lubricant may progress from an outer edge of the wear ring 1 or through a vent holes 29 in the wear ring. Thereafter, the lubricant 28 may flow along the inner wear ring liner 3 axially and/or radially. The arrow designates a first exemplary flow of lubricant 28. In this embodiment, lubricant flows through the vent hole 29, down through hole 27 in the inner wear ring liner 3, around projection 26 axially and/or radially along the shaft (not shown), back through another hole 27 in the wear ring liner, axially and/or radially along the outer wear ring element 2 around another projection 26, then down through another hole 27, etc. In this way, the lubricant allows the heat to be transferred from the outer wear ring element 2 to the shaft 5.

Figure 6:
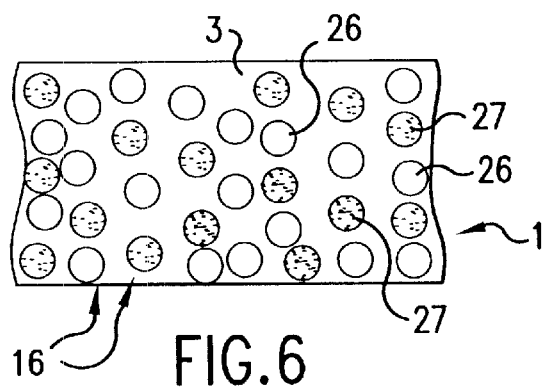
FIG. 6 illustrates another exemplary embodiment of an inner wear ring liner having a plurality of dimples and holes.

FIG. 6 shows another exemplary embodiment where the deformations 16 include a plurality of projections 26 and holes 27 as with the previous embodiments. However, in the embodiment in FIG. 6, the projections and holes are configured to be round. As with the previous embodiments, oil may flow along either the outer or inner surface of the wear ring liner between the various projections 26 and through the various holes 27. In this manner, thermal conductivity may be enhanced between the wear ring and the shaft thus substantially reducing any heat buildup in the outer wear ring element, particular in the area where the annular rubber lip seal 115 contacts the outer wear ring element 2.

Figure 7:
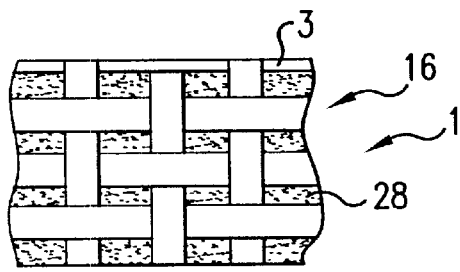
FIG. 7 illustrates an exemplary embodiment of an inner wear ring liner configured in a mesh arrangement.

Referring to FIG. 7, as an alternate arrangement, the inner wear ring liner may include a mesh arrangement 28 (e.g., a woven or non-woven mesh or screen). Where the inner wear ring liner is made porous through the use of a mesh arrangement 28, in exemplary embodiments, a metal matrix such as a copper, bronze, or steel arrangement may be imbedded within the mesh arrangement 28. Alternatively, the mesh arrangement may be completely polymeric. In the embodiment shown in FIG. 7, the mesh arrangement 28 provides the deformations 16 discussed above.

Figure 8:
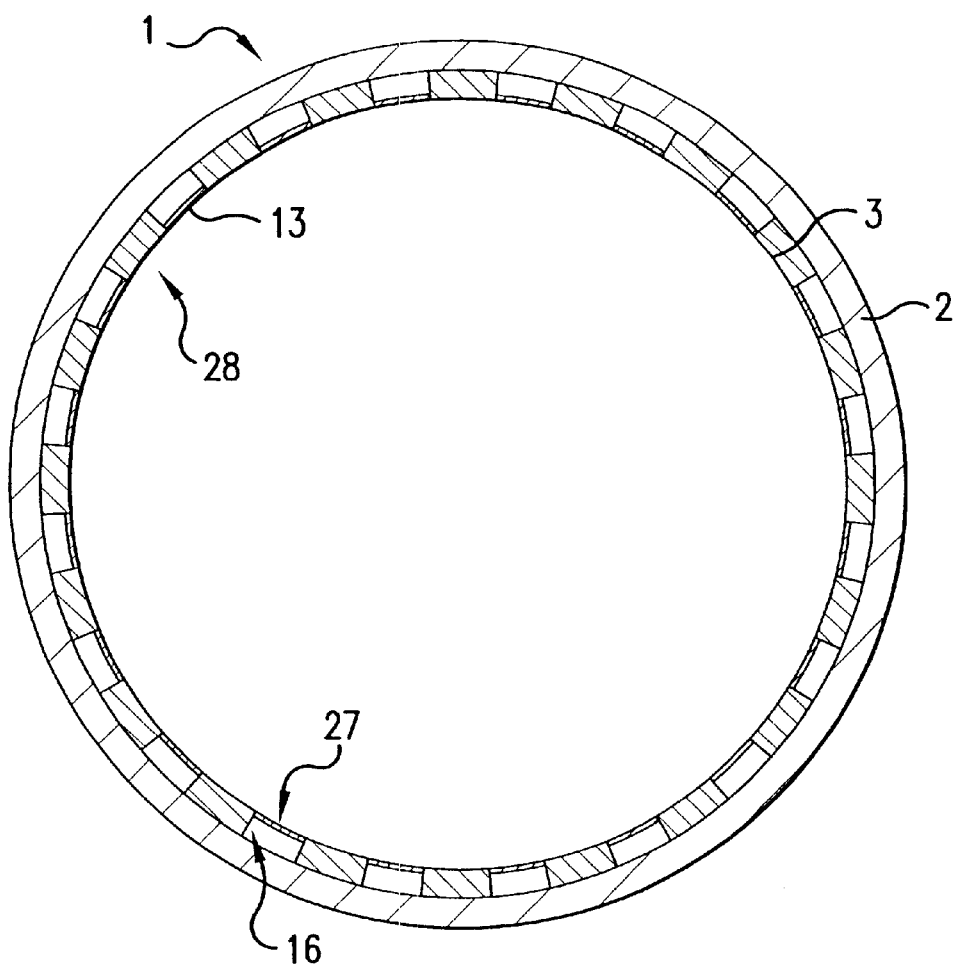
FIG. 8 illustrates a another exemplary embodiment of a wear ring which includes an inner wear ring liner configured in a porous checkered arrangement.

Referring to FIG. 8, another alternate mesh arrangement 28 is shown. In this embodiment, the deformations 16 are formed via a plurality of distributed projections 26 (e.g., configured in a checkerboard pattern) interspersed with a plurality of holes 27 (e.g., configured in a checkerboard pattern). The projections 26 may be interconnected via a plurality of smaller cross section areas 13 which may, for example, accommodate the plurality of holes 27.

Figure 9:
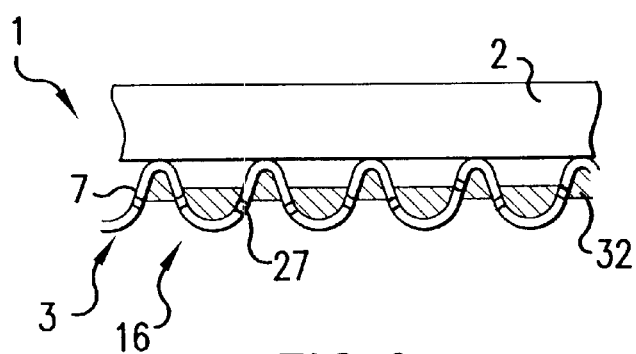
FIG. 9 illustrates another exemplary embodiment of a wear ring having an undulating surface.

An alternative embodiment of the inner wear ring liner 3 is shown in FIG. 9. Referring to FIG. 9, the inner wear ring liner 3 may include deformations 16 configured in a spring arrangement 7 such as a sinusoidal, oscillating, or zigzag configuration with or without a plurality of holes 27. The spring arrangement 7 may include a plurality of supports 32. The supports 32 prevent the spring arrangement 7 from being over compressed irrespective of the amount of deflection of the shaft 5 and/or wear ring 1. The spring arrangement 7 may be made entirely of a polymeric structure to minimize abrasion of the shaft 5. Further, where the spring arrangement 7 is configured to extend the ridges axially along the shaft, lubricant may more easily flow from any vent holes throughout the inner wear ring liner. Where the spring arrangement 7 is configured to extend the ridges circumferentially about the shaft 5, the ridges may more easily trap and maintain lubricant as the spring is pressed onto the shaft 5.

Figure 10:
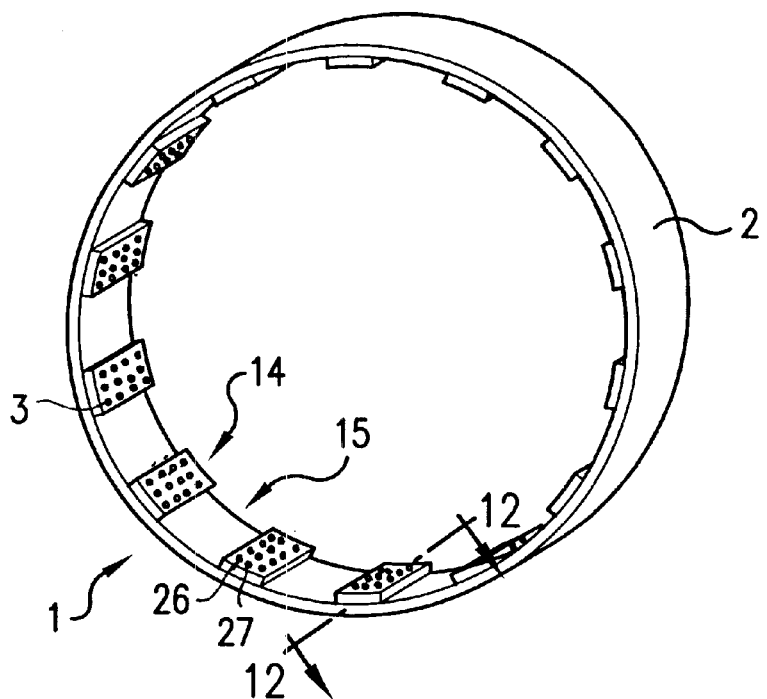
FIG. 10 illustrates another exemplary embodiment having a plurality of sections forming the inner wear ring liner 3.

Referring to FIG. 10, an alternative embodiment of the wear ring 1 may include an inner wear ring liner 3 having a plurality of sections 14. The plurality of sections 14 may be interspersed with a plurality of exposed portions 15. The exposed portions 15 occur about those areas where the outer wear ring element 2 does not have an inner wear ring liner 3. The spacing of the plurality of sections 14 about the outer wear ring element 2 should be such that the sections 14 are sufficiently close together so that an interference fit between the wear ring liner and the shaft may help maintain the concentricity of the wear ring. For example, two or three sections may be utilized. However, in many applications, four, five, six, seven, eight, nine, ten, eleven, twelve, thirteen, fourteen or more sections may be desirable. Although additional sections require additional bonding work, concentricity is improved. In alternate embodiments, the sections 14 may include deformations such as projections 26 and/or holes 27 as discussed above.

Figure 11:
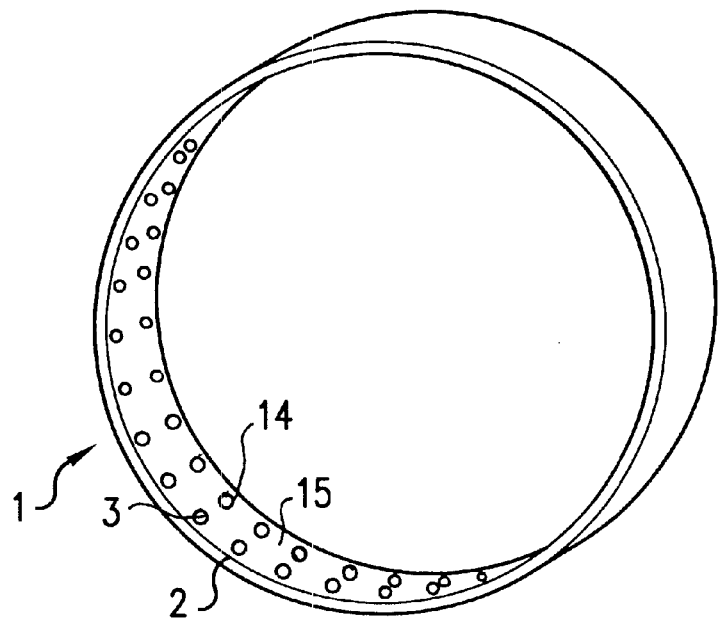
FIG. 11 illustrates a another exemplary embodiment of aspects of the present invention where the inner wear ring liner is formed as a plurality of sections.

FIG. 11 shows another exemplary embodiment where the inner wear ring liner includes a plurality of sections 14 disbursed throughout the inner surface of the outer wear ring element 2. In FIG. 11, the sections 14 cover a relatively small area about the inner surface of the outer wear ring element 2. The overall area covered by the sections 14 as a percentage of the overall area of the inner surface of the outer wear ring element 2 may be less than 50%, less than 40%, or even less than 30%. Where a lubricant is disposed between the wear ring 1 and the shaft 5, having the wear ring liner 5 cover a smaller percentage of the surface area facilitates conductive cooling between the outer wear ring element 2 and the shaft 5.

In each of the above embodiments, deformations 16 may be utilized in the wear ring 1. Where the deformations are utilized, it may be desirable for the deformations to include a uniform cross section and/or a variable cross section in either the axial, radial, and/or circumferential direction. For example, the deformations 16 may have a pre-determined rise angle and a predetermined fall angle. In alternate embodiments, the cross section of the deformations 16 may vary such that ever first, second, third, or fourth deformation extends a higher amount in the radial direction. This allows for a two stage spring action whereby the outer wear ring element 2 may be compressed a first amount in the axial direction against a first spring force, and only compressed beyond the first amount if the compressive force is able to overcome a second spring force, higher than the first. The dual spring action helps force the outer wear ring element 2 back into concentricity with the shaft 5 responsive to the amount of force applied to the wear ring element 2. Additionally, the dual spring action may prevent over compression of the outer wear ring element 2, keeping the wear ring 1 concentric with the shaft.

The axially, radially, and/or circumferentially extending deformations 16 need not be straight but may progress in a non-linear fashion such as a zig-zag, curve, sinusoid, and/or other non-linear pattern arrangement. The non-linear pattern arrangement provides increased spring action and rib strength, but may be more difficult to manufacture. Further, the deformations 16 may include a triangular, rounded, and/or a flattened peak. In exemplary embodiments, the deformations 16 may be separated by a triangular, rounded, and/or flattened valley. For example, referring to FIG. 2A and 2B, the deformations 16 include a flattened peak and a flattened valley. Flattened peaks and/or valleys facilitate machining. However, valleys having a rounded shape increase strength in the same way as an arch provides the maximum strength. Further, it may be desirable to have an inward curvature at the projections 26 of the deformations 16 so as to precisely match with the slight curvature of the shaft 5.

The deformations 16 may be disposed through all or a portion of the inner and/or outer surface of the inner wear ring liner 3. For example, a series of one, two, three, four, five, six, seven, eight or more deformations 16 (e.g., projections and/or holes) may be disposed periodically (e.g., every 10 mm, 20 mm, 30 mm, 40 mm, 50 mm, or 60 mm) around the wear ring 1. The number and frequency of the deformations may vary axially and/or radially along the inner wear ring liner 3. For example, all or some of the deformations need not necessarily extend across the entire axial and/or radial distance of the inner wear ring liner 3. In exemplary embodiments, the deformations may progress from either the inner and/or outer end toward the center and/or from one end to an area just short of the other end. For example, the ribs may terminate prior to reaching the inner and/or outer end 10, 11 (FIG. 3). In these embodiments, it may be desirable to have configure an area of the inner wear ring liner 3 near either the inner or outer end of the wear ring in a solid configuration, i.e., without any deformations. It may be desirable in some embodiments to configure the inner wear ring liner with a solid portion near the end of the wear ring 1 which abuts the inner bearing race 102 and a more resilient second portion along part or all of the remaining portions of the inner wear ring liner. In this manner, the face wear of the inner bearing race 102 can be substantially reduced by increasing the stiffness of the wear ring 1 in the area adjacent to the inner race.

Referring to FIGS. 12–15, the inner wear ring liner 3 may extend from the inner end 10 to the outer end 11 across the entire outer wear ring element 2. By having the wear ring liner 3 extend across the entire outer wear ring element 2, it is possible to more accurately conform the outer wear ring element 2 to the concentricity of the shaft 5. Further, the tendency of the wear ring liner to become askew is eliminated. Additionally, by utilizing the entire inner surface of the outer wear ring element 2, there is greater bonding area to form the inner wear ring liner 3 integral with the outer wear ring element 2. The greater bonding area allows a tighter interference fit between the wear ring 1 and the shaft without destroying the wear ring 1 as it is pressed into position. Further, where a configuration having deformations along the inner surface of inner wear ring liner is utilized, the deformations tend to reduce the friction between the shaft 5 and the wear ring 1 by reducing the surface area in contact with the shaft. Thus, the wear ring 1 may have even a tighter interference fit with the shaft.

Again referring to FIGS. 12–15, by extending the inner wear ring liner 3 all the way across the outer wear ring element 2, the inner wear ring liner 3 is retained by the inner race 102, the backing ring 101, and/or the fillet 110. This arrangement is very advantageous in that axial expansion of the inner wear ring liner is present even where there is repeated compression and decompression cycles. Where the inner wear ring liner does not abut the inner race, backing ring 101, and/or fillet 110, the inner wear ring liner 3 may tend to extrude and/or expand axially, thus reducing its radial thickness. Consequently, eventually, the interference fit between the wear ring 1 and the shaft 5 may degrade. The extrusion and/or expansion problem is particularly acute along the portion of the wear ring 1 which abuts the inner race 102. Thus, where only one side of the inner wear ring liner is constrained, in many configurations, it may be desirable to abut the inner wear ring liner 3 against the inner race 102.

Figure 12:
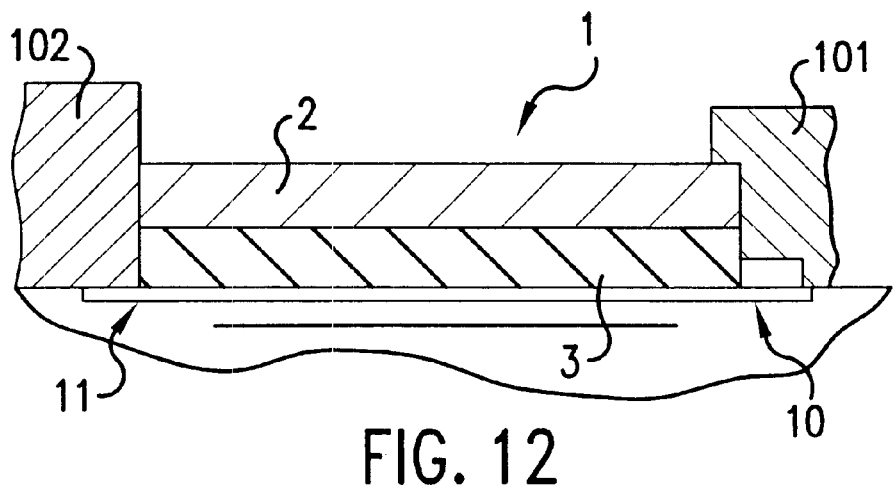
FIGS. 12–15 illustrate various bearing assemblies where the wear ring liners are constrained at one or both ends to prevent expansion or other deformation.
Figure 13:
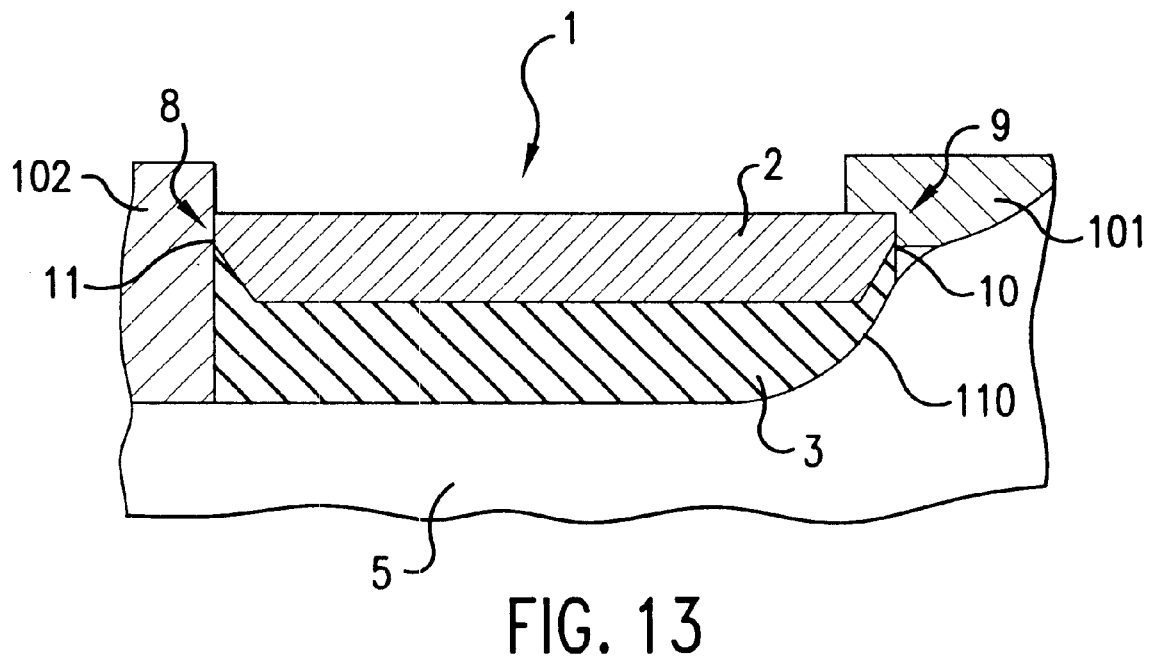
Figure 14:
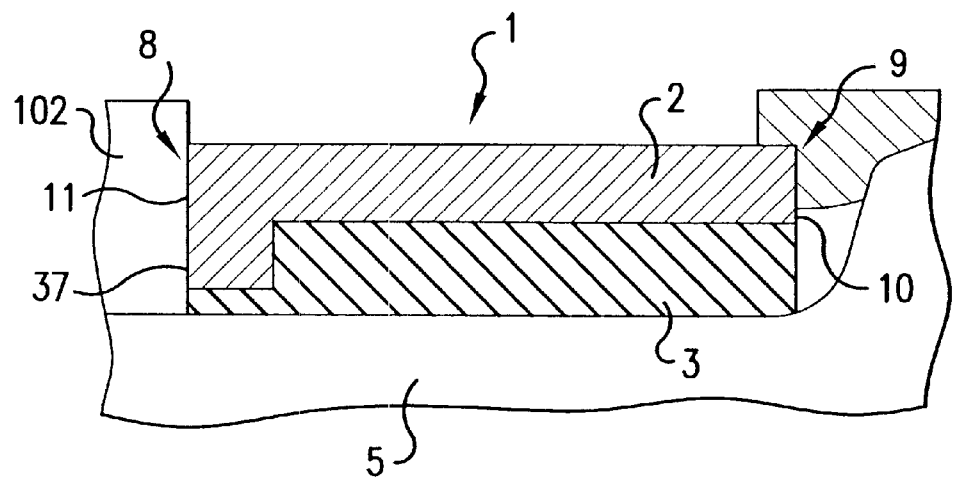
Figure 15:
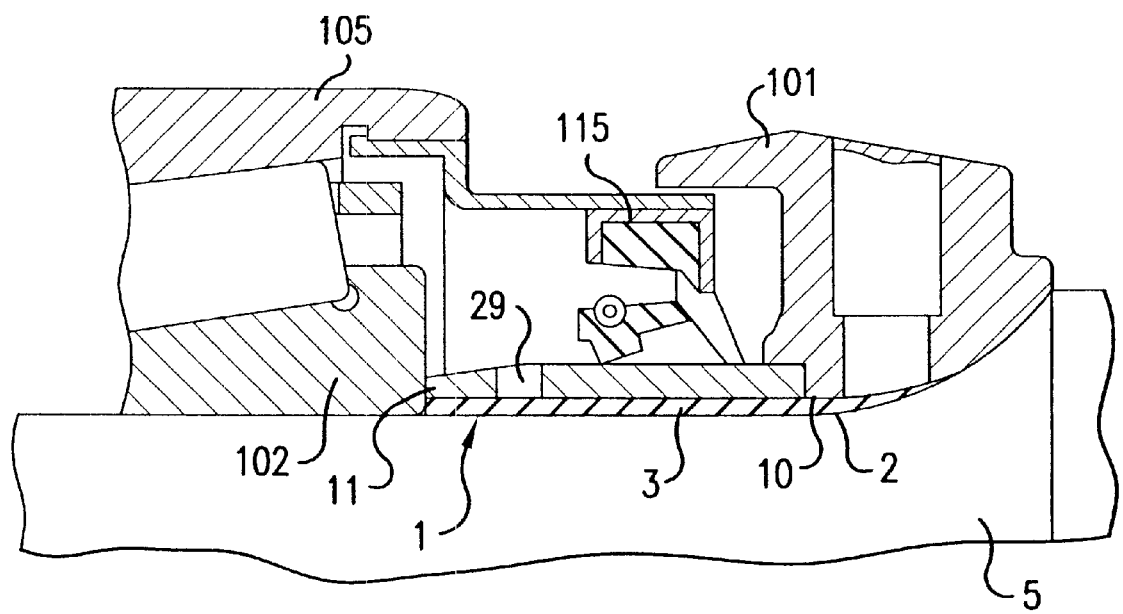

FIG. 12 shows a cross section of the wear rings discussed herein disposed in an exemplary bearing assembly arrangement. For example, the wear ring shown in FIG. 12 may be a cross sectional view across line 12—12 of FIG. 10 or across line 12—12 of FIG. 3. Referring to FIG. 12, an inner wear ring liner 3 may be restrained between and/or compressed by the inner bearing race 102 and the backing ring 101. FIG. 13 shows an exemplary embodiment where the inner wear ring liner 3 is restrained between and/or compressed by the fillet 110 (tapered portion of the shaft) and the inner bearing race 102. FIG. 14 shows another exemplary embodiment where an inner wear ring liner is retained and/or compressed against an inner race 102. In the embodiment shown in FIG. 14, the outer wear ring element 2 includes a foot 37. The foot 37 may be desirable to prevent the destruction of the wear ring 1 as it is pressed onto the shaft 5. Further, the foot 37 may be utilized to reduce the cross sectional area in the radial direction of the inner wear ring liner 3 and hence substantially increases the rigidity of the wear ring 1 adjacent the inner bearing race 102. This increased rigidity tends to reduce face wear along the face of the inner bearing race 102. FIG. 15 shows another exemplary embodiment where the inner wear ring liner 3 is retained and/or compressed against the inner race 102. In the illustrated embodiment, the outer wear ring element 2 is in a tapered configuration, whereas the inner wear ring liner 3 is maintained at a constant thickness in the radial direction.

Referring to FIGS. 16–21, the inner wear ring liner 3 may be coupled to the outer wear ring element 2 utilizing any number of suitable techniques. For example, the inner wear ring liner 3 may be made integral with the outer wear ring element 2 using molding, forming, ultrasonic bonding, chemical bonding, interference fit, shrink fit, and/or other bonding techniques. Where forming or molding is utilized, the inner wear ring liner 3 may be made integral with the outer wear ring element 2 by coating, molding, or forming an inner liner onto an inner surface of the outer wear ring element 2. As discussed above, the inner liner may be formed from any appropriate low friction material such as a polymeric, synthetic rubber, graphite, or other suitable material.

In the exemplary embodiments, the inner wear ring liner 4 is made integral with the outer wear ring element 2 prior to pressing the wear ring onto the journal. This may be accomplished by forming, welding, mechanically bonding, and/or chemically bonding the inner wear ring liner 3 to the outer wear ring element 2.

Figure 16:
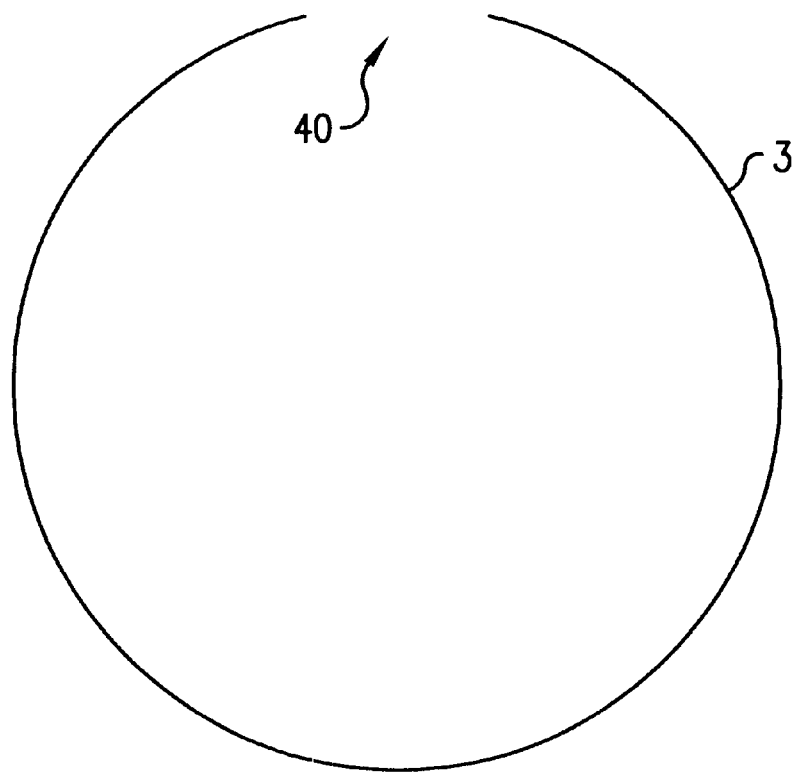
FIG. 16 shows an inner wear ring liner which extends only partially around the outer wear ring element.
Figure 17:
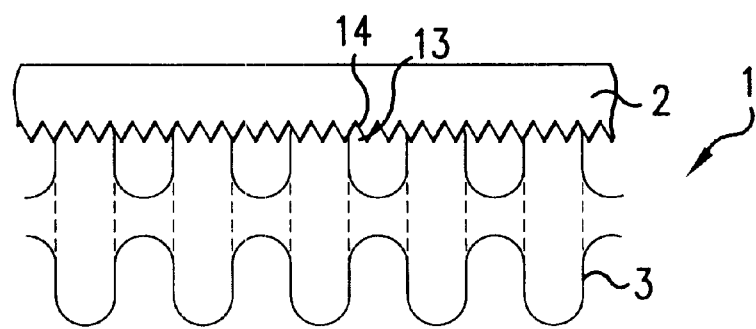
FIGS. 17–21 illustrates various interlocking mechanisms for configuring an integral wear ring by coupling the inner wear ring liner to the outer wear ring element.

In exemplary methods of forming an integral wear ring 1, the outer surface 8 of the inner wear ring liner 3 is chemically treated and/or heated. This may be accomplished either while inserted in the outer wear ring element 2 and/or prior to insertion into the outer wear ring element 2. After treating, the inner wear ring liner 3 may be pushed out radially to form an integral bond with the outer wear ring element 2. Where the bonding operation requires the inner wear ring liner 3 to be inserted into the outer wear ring element 2, it may be desirable to have an inner wear ring liner 3 which is in a configuration other than a ring. For example, the inner wear ring liner 3 may be inserted into the outer wear ring element 2 and then bonded using any suitable technique such as ultrasonic bonding. Since the wear ring liner does not form a ring, bonding is substantially simplified. Examples of a wear ring liner which does not form a ring is shown in FIG. 16, as well as the sections 14 previously discussed with regard to FIGS. 10 and 11. For many bonding techniques such as ultrasonic welding and/or chemical bonding it is difficult to form a adequate bond when using an inner wear ring liner 3 in the shape of a ring. Thus, the ring shaped liners are relegated to inferior retention techniques such as a compression fit. The use of these techniques is problematic in that the liner can dislodge from the wear ring. However, where the shape of the inner wear ring liner 3 is not in the shape of a ring, improved bonding techniques such as chemical, ultrasonic, and/or mechanical interlock bonding may be utilized.

Figure 18:
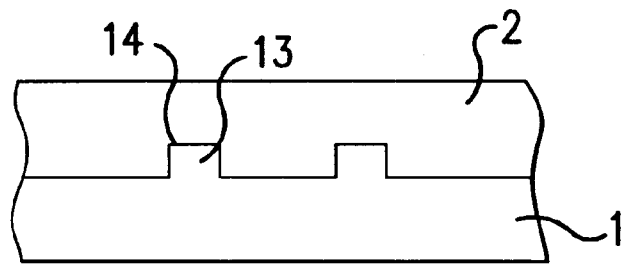
Figure 19:
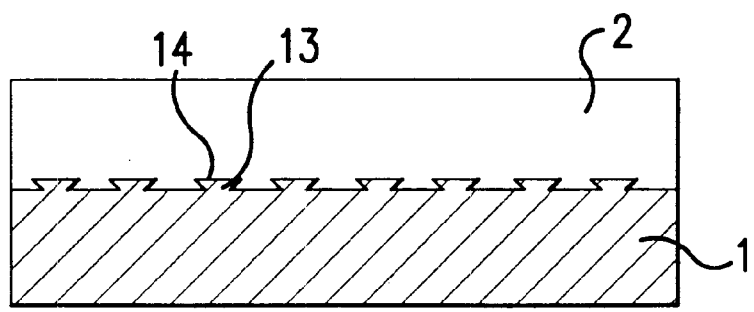
Figure 20:
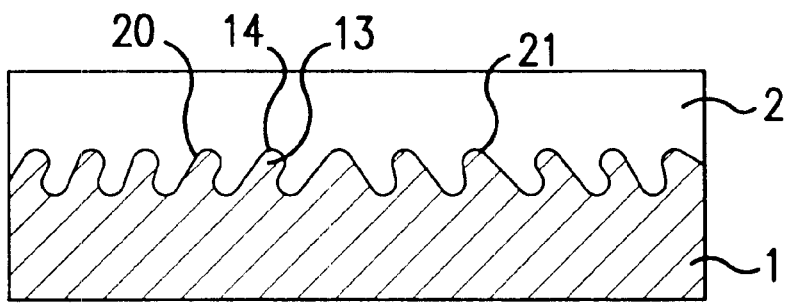
Figure 21:
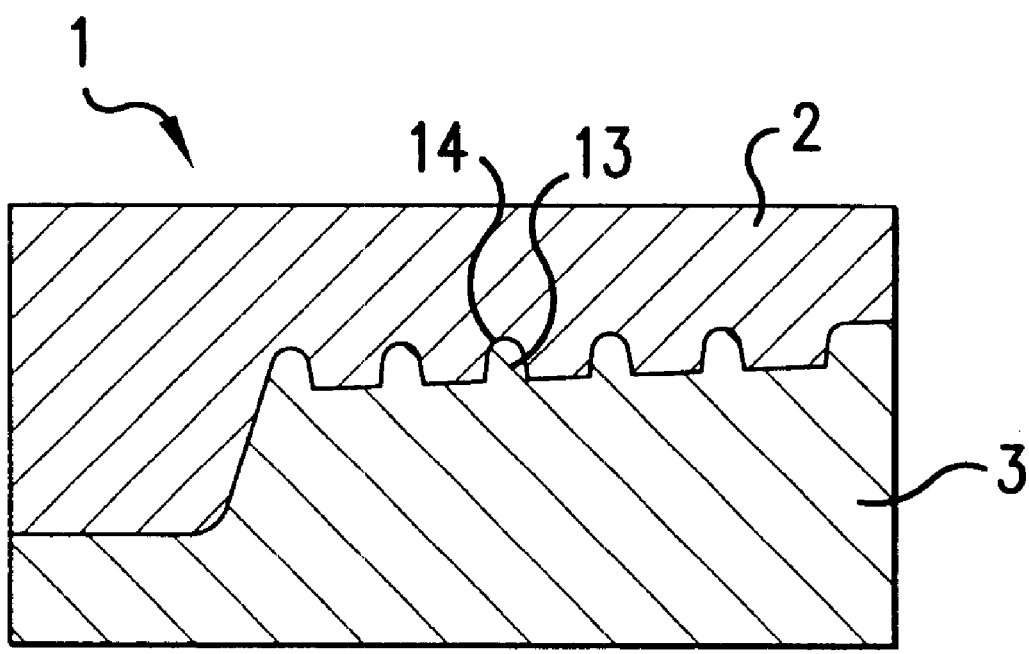

In exemplary embodiments, various surface treatments for the inner surface of the outer wear ring element 2 may be utilized. For example, grooves, channels, ridges, abrasions, sharks teeth, interlocking mechanisms, divots and/or other mechanisms may be utilized to increase adhesion between the inner wear ring liner and the outer wear ring element. In the exemplary embodiment shown in FIG. 17, a channel type surface treatment is utilized having a plurality of circumferential v-shaped grooves about the inner surface of the outer wear ring element 2. FIG. 18 shows a plurality of indents 14 and corresponding protrusions 13 which may be utilized to interlock the inner wear ring liner 3 with the outer wear ring element 2. In FIG. 18, the indents 14 and corresponding protrusions may be variously configured to be circumferential and/or spiral channels, divots, elongated slots/ridges, or other suitable arrangement. FIG. 19 shows a plurality of interlocking channels and/or buttons. The protrusions 13 may be formed via a welding and/or forming operation directly into indents 14, and/or molding/machining operation and then press fit into indents 14. FIG. 20 shows a plurality of indents 14 and corresponding protrusions 13 which are sloped in one or more directions. In the illustrated embodiment, a first set of indents/protrusions 20 are sloped axially in a first direction and a second set of indents/protrusions 21 are sloped axially in a second direction. This bi-directional interlocking maintains the wear ring 1 integral regardless of whether it is being pressed on or off of the shaft 5. FIG. 21 shows an L-shaped outer wear ring element fitted with a plurality of rounded circumferentially extending channels. Any of the surface treatments discussed herein may be utilized with respect to the inner surface of the outer wear ring element 2. As will be well understood in the art, any of the inner wear ring liners 3 discussed herein may be coupled to the various outer wear ring elements 2 discussed herein using any of the techniques described herein, in any combination.

In alternate embodiments, the inner wear ring liner 3 may be formed by injection molding or other suitable fluid flow operation where a low friction type material is forced into the space between the shaft (or a similarly dimensioned mold part) and the outer wear ring element before and/or after the wear ring element is pressed into the backing ring. Where an injection forming operation is utilized, one or more molds/spacers may be inserted onto the shaft/mold part and/or between the shaft and the outer wear ring element to maintain perfect concentricity of the wear ring prior to fixing the wear ring into place in the molding operation.

Where an injection molding process may be utilized the outer wear ring element may be first machined to create a rough inner surface and then the injection molding mold or dye may be fitted to the inside of the outer wear ring element. Thereafter, a polymer, rubber, and/or plastic material may be injected into the wear ring. The injection molding operation may use any of the inner wear ring liner configurations discussed above. Thereafter, the mold is removed and inserted into the next outer wear ring element. The injection molding insert into the wear ring provides the inner mold surface and the outer wear ring element provides the outer mold surface. Additionally, by roughing the inner surface of the wear ring and/or creating a plurality of deformations on the inner surface of the wear ring, the overall surface area of the inside of the wear ring has been substantially increased. Thus, the heat transfer to any lubricant (and thus to the shaft) may be substantially enhanced.

Where in the inside surface of the wear ring is machined to include one or more ridges and/or shark's teeth, it may be preferable that the ridges and/or shark's teeth are at least three-thousandths, preferably five-thousandths, even more preferably seven-thousandths, and most preferably at least ten, twenty, or thirty-thousandths deep. In this manner, the shark's teeth and/or ridges and/or dimples securely bond the inner wear ring liner 3 to the outer wear ring element 2, forming an integral wear ring 1. Where the deformations are at least five-thousandths or at least ten-thousandths deep, bonding is substantially enhanced. Where the deformations are at least ten-thousandths deep, there is substantial roughness on the inside surface of the outer wear ring element which provides a secure integral bond.

In other embodiments, the inner wear ring liner 3 may be pressed on, formed on, coated on, and/or molded onto the shaft prior to the fitting of the outer wear ring element 2 onto the shaft. This installation operation allows the substantial forces necessary to seat the outer wear ring element 2 to be exerted only against the outer wear ring element 2. Further, the liner can act to properly center the outer wear ring element 2 during the pressing operation. However, these embodiments may be less desirable in where it is necessary to form a tight fit between the outer wear ring element 2 and the inner wear ring liner 3. Where a molding operation occurs about the shaft, any imperfections in the shaft are accommodated without machining and/or plating the shaft.

The inner wear ring liner 3 may be installed as part of a new bearing or as a retrofit part of a rebuilt bearing. In the most cases, it is desirable to install the inner wear ring liner 3 from the start of initial service so that no damage occurs to the journal before the initial repair operation. Alternatively, the inner wear ring liner 3 may be retrofit into existing bearing assemblies using either a new or reconditioned wear ring 2.

Any number of additional binding options are possible for making the inner wear ring liner 3 integral with the outer wear ring element 2. In exemplary embodiments, the wear ring liner 3 may be interlocked with the outer wear ring element using one or more interlocking mechanisms. In alternate embodiments, the surface of the outer wear ring element may be roughed to increase adhesion. In these embodiments, the inner surface of the outer wear ring assembly may be roughed to a roughness of 80 grit or preferably 60 grit or even preferably 40 grit so that the inner surface is able to retain the wear ring liner with a large adhesion strength. Additionally, the rough surface area increases the surface area available to transfer heat to any lubricating fluid and hence to the shaft.

In addition to and/or as an alternative to any of the mechanical interlocking arrangements discussed above, bonding may be achieved to using chemical and/or heating to secure the outer wear ring element 2 to the inner wear ring liner 3. Where bonding is to be achieved using heating, an ultrasonic bonding tool may utilized to vibrates the inner wear ring liner 3 and/or the outer wear ring element 2 relative to each other at a high speed and thus melt the inner wear ring liner 3 sufficient so that it is pressed into the grooves, deformations, shark teeth, dimples and/or other rough surface arrangement of the outer wear ring element 2 and thus becomes permanently bonded. This is a highly reliable low cost method of bonding that is particularly efficient for wheel bearing assemblies. Alternatively, where a very high temperature material is utilized for the inner wear ring liner, chemical bonding may be utilized as opposed to heat bonding.

This may be done, for example, by inserting an ultrasonic welding and/or bonding tool inside the wear ring and using either air pressure or mechanical pressure to force the wear ring liner sections 14 outwardly into the outer wear ring element 2 as it is ultrasonically vibrated to form an integral bond between the outer wear ring element and the inner wear ring liner sections 14.

As a further matter, the amount of interference fit between the wear ring liner 1 and the journal shaft 5 may be varied depending on the bond that is accomplished between the outer wear ring element 2 and the inner wear ring liner 3. Where a higher interference fit is utilized between the wear ring 1 and the shaft 5, it may be desirable to include a pre-lube on the wear ring 1 and/or shaft 5 prior to pressing the wear ring 1 onto the shaft 5. In any event, the bonding between the outer wear ring element 2 and the inner wear ring liner 3 should be sufficient to maintain the inner wear ring liner 3 in position while the wear ring 1 is being pressed on or off of the shaft 5. Where the inner wear ring liner has been compressed via one or more cycles of pressing on the shaft 5 beyond tolerance, the inner wear ring liner 3 may be discarded and replaced prior to installing the wear ring on the shaft 5.

As a separate process, when a wear ring with an inner wear ring liner 3 is returned to be remanufactured, a reverse process may be utilized to remove the inner wear ring liner 3 from the outer wear ring element 2 such as by ultrasonically vibrating the wear ring liner to heat the wear ring liner and thus remove it from the wear ring 2. In this manner, a new inner wear ring liner 3 may be inserted and re-ultrasonically bonded to the inner wear ring liner by simply, again vibrating the new wear ring liner which may bond with any residual wear ring material left in pockets of the wear ring 2. If desirable, an alternative method would be to remove any residual polymeric material from the wear ring 2 using a rebuffing process.

While exemplary systems and methods embodying the present invention are shown by way of example, it will be understood, of course, that the invention is not limited to these embodiments. Modifications may be made by those skilled in the art, particularly in light of the foregoing teachings. For example, each of the elements of the aforementioned embodiments may be utilized alone or in combination with elements of the other embodiments. Additionally, in alternate embodiments, the inner wear ring liners may be solid or configured to include any of the deformations or other arrangements discussed herein. Thus, the deformations and/or other bearing assembly arrangement shown with respect to one of the figures above may be interchanged with a bearing arrangement and/or inner wear ring liner of another configuration.

What I claim is:

1. A bearing assembly for positioning about a portion of a shaft, said bearing assembly comprising:
   a bearing cap including an inwardly directed raceway;
   a race having an outwardly directed raceway facing said inwardly directed raceway;
   a bearing located between the inwardly and outwardly directed raceways; and
   a wear ring including an outer wear ring element and a non-metallic wear ring liner having a plurality of deformations.

2. The wear ring liner of claim 1 wherein the deformations comprise a plurality of axially extending ribs.

3. The bearing assembly of claim 1 wherein the deformations comprise a plurality of fluid flow passages.

4. The bearing assembly of claim 3 wherein the fluid flow passages provide fluid communication through the non-metallic wear ring liner.

5. The bearing assembly of claim 4 wherein the fluid flow passages extend axially from a first end to a second end of the non-metallic wear ring liner.

6. The bearing assembly of claim 3 wherein the fluid flow passages include a lubricant.

7. The wear ring liner of claim 1, wherein the deformations include projections.

8. The wear ring liner of claim 7 wherein the projections have a peak configured to include a curvature which mates with a shaft.

9. A bearing assembly for positioning about a portion of a shaft, said bearing assembly comprising:
   a bearing cap including an inwardly directed raceway;
   a race having an outwardly directed raceway facing said inwardly directed raceway;
   a bearing located between the inwardly and outwardly directed raceways; and
   a wear ring including an outer wear ring element and a wear ring liner comprising a plurality of axially extending ribs.

10. The bearing assembly of claim 9 including a plurality of holes.

11. The bearing assembly of claim 10 including a lubricant disposed in the holes.

12. The bearing assembly of claim 9 including a lubricant disposed between the ribs.

* * * * *

UNITED STATES PATENT AND TRADEMARK OFFICE
CERTIFICATE OF CORRECTION

PATENT NO. : 6,334,713 B1
DATED : April 9, 2002
INVENTOR(S) : Tim Chu

It is certified that error appears in the above-identified patent and that said Letters Patent is hereby corrected as shown below:

<u>Column 14,</u>
Line 13, delete "wear ring liner" and insert -- bearing assembly --,
Line 26, delete "wear ring liner" and insert -- bearing assembly --,
Line 28, delete "wear ring liner" and insert -- bearing assembly --, Signed and Sealed this Fifteenth Day of October, 2002

*Attest:*

*Attesting Officer*

JAMES E. ROGAN
*Director of the United States Patent and Trademark Office*